United States Patent
Barilli

[11] Patent Number: 5,573,455
[45] Date of Patent: Nov. 12, 1996

[54] PROCESS FOR FORMING FOODSTUFFS IN SACKS, IN PARTICULAR MORTADELLA

[75] Inventor: Luigi Barilli, Fidenza, Italy

[73] Assignee: I.B.I.S. Industria Bussetana Insaccati Suini S.P.A., Busseto, Italy

[21] Appl. No.: 511,314

[22] Filed: Aug. 4, 1995

Related U.S. Application Data

[63] Continuation of PCT/IT94/00007, Feb. 1, 1994.

[30] Foreign Application Priority Data

Feb. 26, 1993 [IT] Italy ................. PR93A0006

[51] Int. Cl.$^6$ ................................... A22C 11/02
[52] U.S. Cl. .................. 452/35; 452/45; 426/105
[58] Field of Search ......................... 452/35, 37, 36, 452/45, 40; 426/105

[56] References Cited

U.S. PATENT DOCUMENTS

| | | | |
|---|---|---|---|
| 2,568,491 | 9/1951 | Edwards | 452/45 |
| 3,739,427 | 6/1973 | Niedecker | 452/45 |
| 4,570,298 | 2/1988 | Tribbett | 452/36 |
| 4,731,906 | 3/1988 | Matthews, et al. | 452/35 |
| 5,035,671 | 7/1991 | Anderson et al. | 452/35 |

FOREIGN PATENT DOCUMENTS

| | | |
|---|---|---|
| 444873 | 10/1912 | France . |
| 1429827 | 1/1969 | Germany . |
| 2304799 | 8/1974 | Germany . |
| 3403753 | 11/1984 | Germany . |
| 8518910 | 8/1985 | Germany . |
| 3642977 | 6/1988 | Germany . |
| WO8808670 | 11/1988 | WIPO . |

*Primary Examiner*—Willis Little
*Attorney, Agent, or Firm*—Darby & Darby, P.C.

[57] ABSTRACT

The invention relates to the field of processes for preparation of foodstuffs in sacks, in particular mortadella, and precisely it relates to a process for forming food in sacks which provides, subsequently to an extrusion of a principal mixture, fo an extrusion of a second mixture internal to the principal mixture and designed to give identification to single slices of the product with a well-defined design formed by extrusion of the second mixture.

13 Claims, 4 Drawing Sheets

PROCESS FOR FORMING FOODSTUFFS IN SACKS, IN PARTICULAR MORTADELLA

BACKGROUND OF THE INVENTION

This application is a continuation of PCT/IT94/00007, filed Feb. 1, 1994.

The invention relates to a process for forming foodstuffs in sacks, in particular mortadella, also known as Bologna or baloney.

Mortadella is usually formed by extrusion of the basic mixture, comprising porkmeat, fats and various spices, into a sack constituted either by animal gut or lining or a synthetic substitute, which is attached to the extruder by an operator. The sack is normally closed at one end, and once it has been filled and detached from the extruder it is closed at its free inlet end.

When cut, the slices of mortadella are usually circular in shape and exhibit a substantially uniform colour, with the lighter-coloured fats mixed in with no particular pattern.

Though the whole mortadella has the producer's name written on the outside, no single slice advertises its origin and no identification system exists which can offer the consumer a clear guarantee of origin of such a small quantity.

DE 8518910 teaches a device for the production of pasteries having two coaxial filling tubes, one inserted in the other, with one of the tubes projecting from the other. These devices produce pastries with internal designs of various types, thanks to the different mixtures that exit from either tube. The process envisages that the tubes fill rigid molds with the tubes staying at a fixed height while the mold progressively descends so that it can be filled, the vertical movement being provided by a hydraulic jack.

DE 3716237 teaches a filling head for a device for the production of pastries, constituted by portions having different fillings. The portions are made using filling tubes with different conformations and transversal sections, which filling tubes perform a contemporaneous extrusion of all of the fillings.

The above-described devices and methods can be applied to other kinds of foodstuffs, such as for example meats, providing the molds to be filled are rigid.

In the case of mortadella, the above-described systems do not enable well-defined designs to be made at the centre of the mortadella (and therefore at the centre of the single slice of mortadella), since the sack used is elastic and the mixture making up the mortadella is not homogeneous as in the case of pastries, and also since the filling processes envisaged in the above methods envisages that both the filling tubes be fixed and the molds vertically mobile during the filling phase.

DE-A-2304799 discloses a process for the formation of foodstuffs in a sack of the type comprising the annular extrusion of a principal mixture by a first extruder made around a second extruder already present in the sack.

An extrusion of an identifying mixture is made through the second extruder.

During the extrusion the sack is supported within a rigid container in such a way as the final product has a well definite and regular shape with rectilinear walls.

Such a process has the same drawbacks al ready cited hereinbefore.

A further embodiment disclosed by the same document shows a sack filled by two concentric and fixed extruders like those of prior art already discussed hereinbefore.

A principal aim of the present invention is to eliminate the above-mentioned drawbacks and provide a process for the formation of meat in sacks in which the final product is such that the single slices exhibits a well-defined identifying design.

SUMMARY OF THE INVENTION

The said aims are fully attained by the process of the present invention, for the formation of foodstuffs flexible sacks, in particular mortadella, of the type comprising the extrusion of a principal mixture in a sack by a first extruder up until the sack is full, characterised in that subsequently to said extrusion, a second extruder is inserted up to the end of the sack, which second extruder injects a second, identifying mixture inside, and preferably at the centre of, the principal mixture, along the whole length of the sack.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which.

Figure 4:
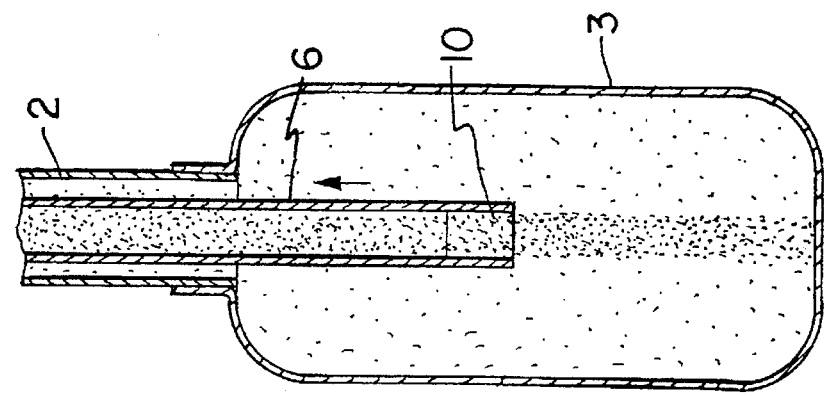
FIGS. 1, 2, 3 and 4 illustrate phases of the process according to a first sequence.

DESCRIPTION OF THE PREFERRED EMBODIMENTS.

With reference to the figures, 1 denotes a sack-filling machine which fixed extruder 2 extrudes a principal mixture inside an animal or synthetic sack 3 previously applied directly on the extruder 2 by an operator or by means of special applicators of known type.

In the specific case of mortadella, the principal mixture is porkmeat containing fats and various spices.

During or after the extrusion of the principal mixture, a second extruder 6 is inserted progressively into the sack up until it reaches the end, when it begins to introduce a second mixture which will serve to identify the mortadella since it is distinguishable from the principal mixture.

The second extruder 6 is mobile, being moved by a device constituted by a ratiomotor 7 setting a kinematism in motion to cause a translation of the second extruder 6 from an external postion with respect to the sack to an inserted position right at the end of the sack.

The extruders 2 and 6 can be arranged with a vertical, horizontal or inclined axis.

8 denotes a second sack-filling machine for the supply of the second, identifying mixture through the second extruder 6. The identification mixture is of a different colour and appearance to the principal mixture.

The shape of the second extruder 6 can be such that the single slice exhibits, preferably at its central zone, a letter of the alphabet or a special geometric shape.

Figure 6:
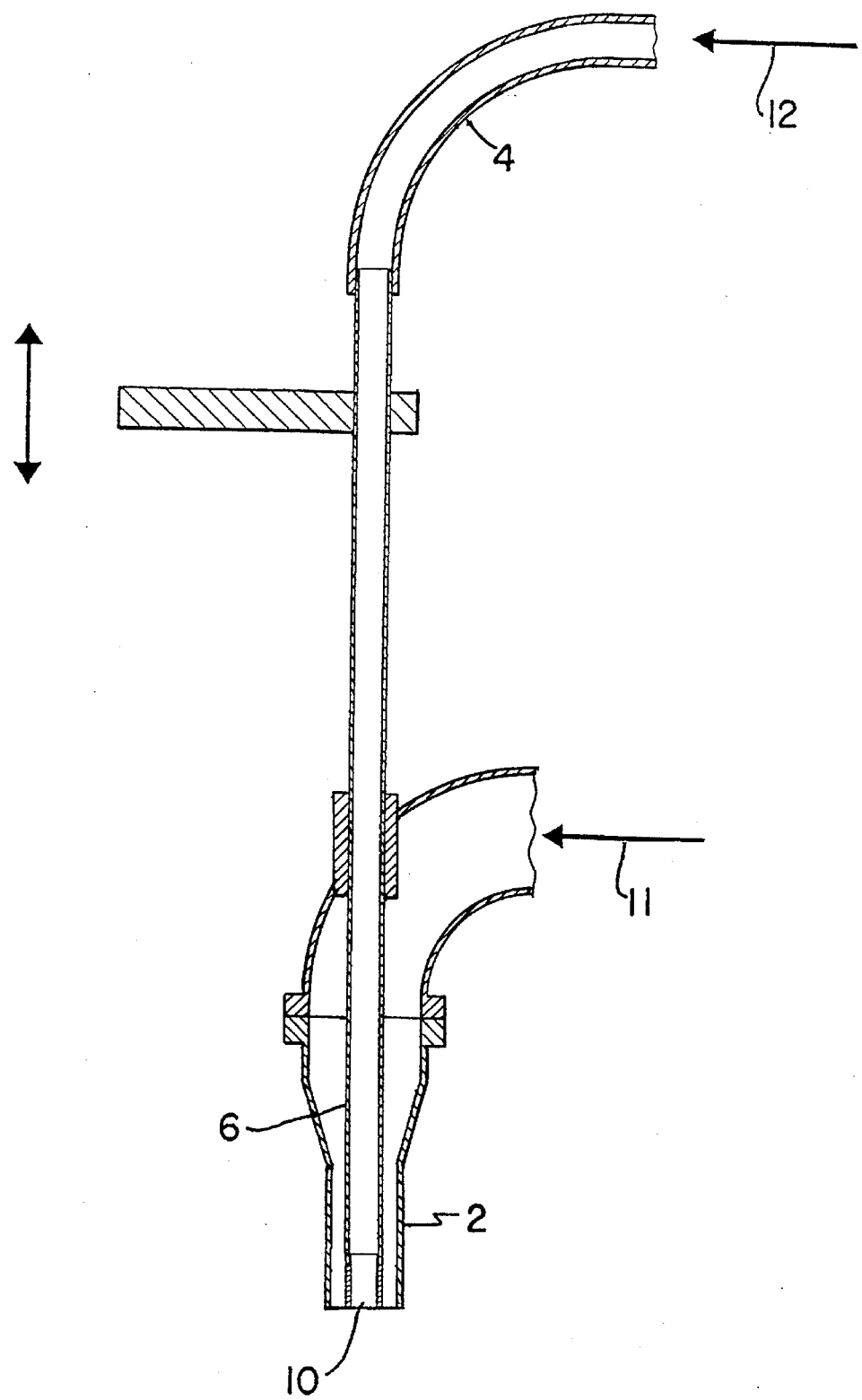
Figure 7:
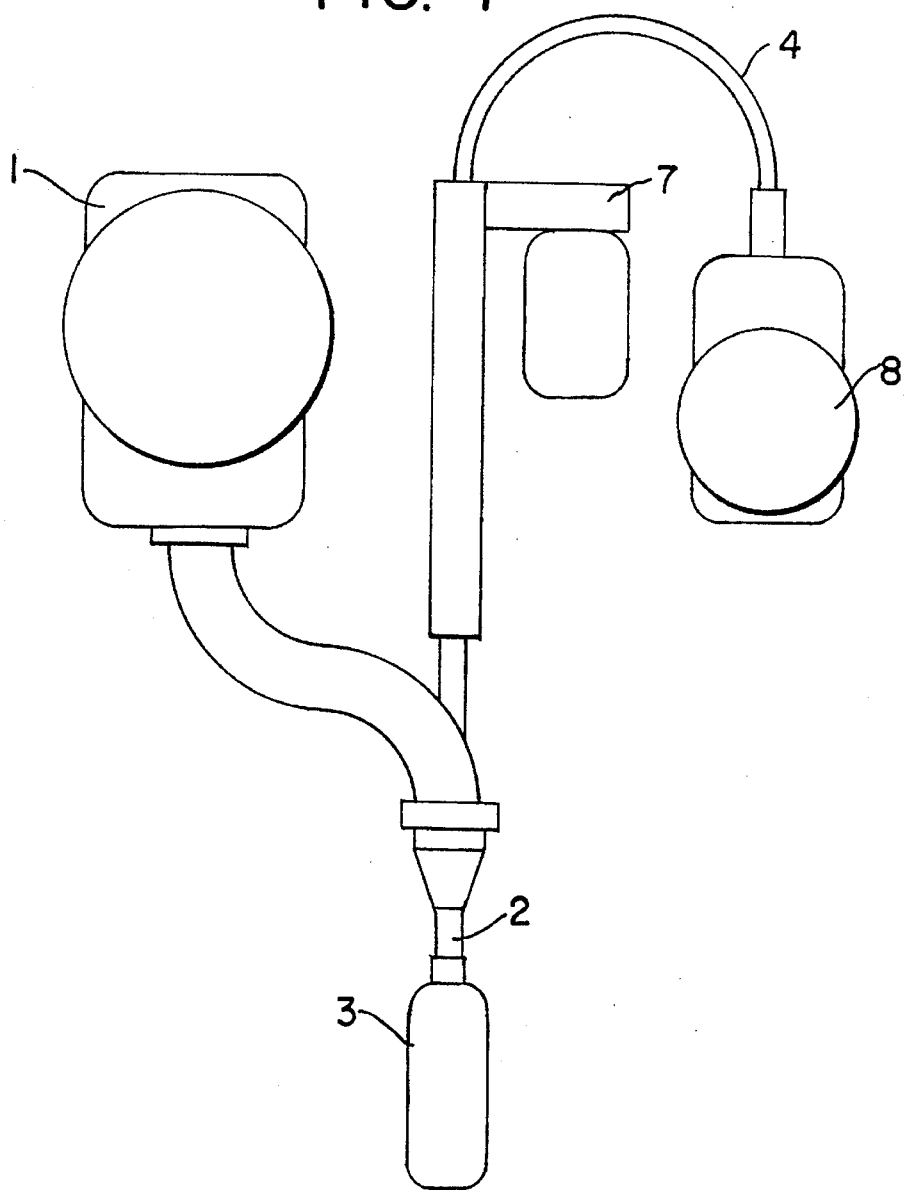
FIG. 7 shows a typical arrangement of the machinery.

The second extrusion, which is subsequent to the extrusion of the principal mixture, when the sack has already been filled, can be carried out according to one of the following modalities. A first operative sequence, carried out according to the scheme of FIG. 6, envisages that the second extruder 6 has at least one flexible connection 4 which enables the second extruder 6 to be progressively withdrawn from the end of the sack, while at the same time the second sack-filling machine 8 pumps the identification mixture and causes it to flow into the sack through the second extruder 6. The pumping speed is equal to the withdrawal speed of the second extruder 6 from the sack, so that the identification mixture stays substantially still with respect to the principal mixture during its release.

Figure 3:
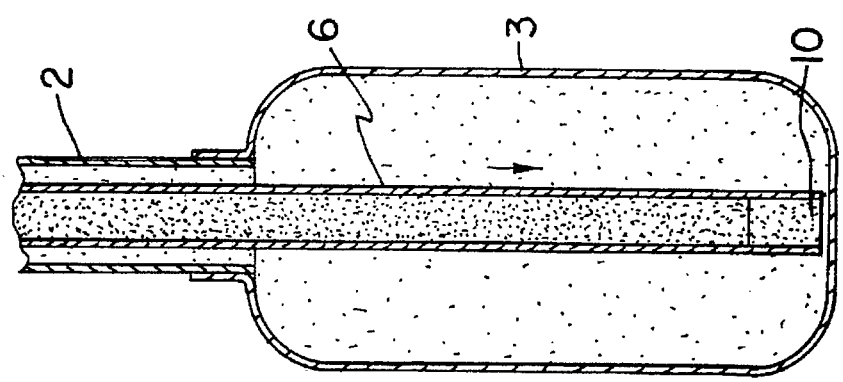
Figure 2:
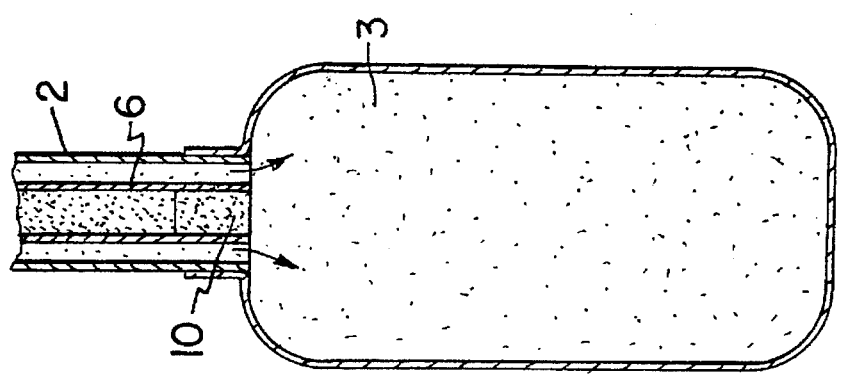
Figure 1:
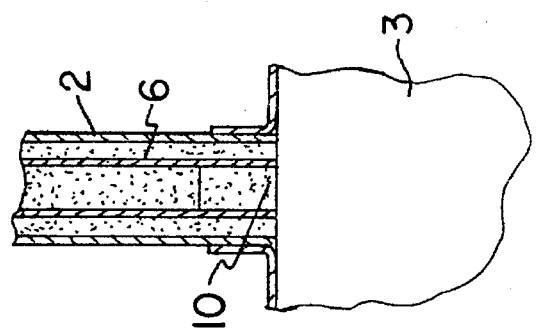
Figure 5:
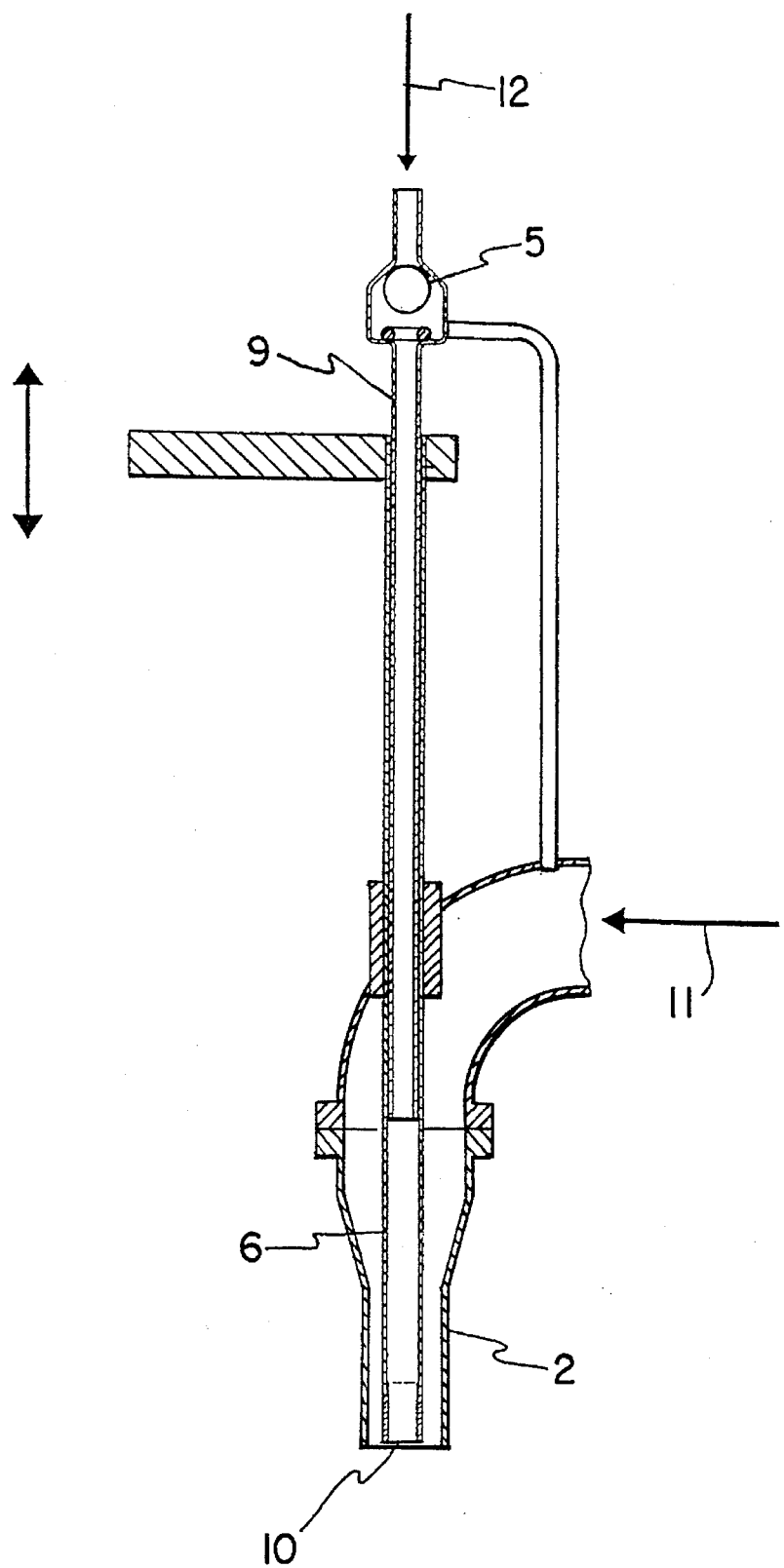
FIGS. 5 and 6 schematically show plants for realising the process, according to two different operative sequences.

A second operative sequence, illustrated in FIGS. from 1 to 4, can be carried out according to the process sketched in FIG. 5, and envisages that the second extruder 6 is filled with the identification mixture during the penetration phase into the principal mixture (FIG. 3), that an identification mixture inlet valve 5 is held back in the tube 5, and that the tube is telescopically withdrawn from the sack, thus delivering the identification mixture (FIG. 4). It is obvious that in the second case the second extruder 6 must be telescopic and the delivery is carried out when the identifying mixture is still. Where the second extruder 6 is inserted at the same time as the extrusion of the principal mixture, the second extrusion process is carried out at the end of the principal mixture extrusion, when the sack has already been filled.

The valve 5 can be a nonreturn valve, or it could be substituted by stopping the sack-filling machine 8.

The telescopic tube 6 can be of the type illustrated in FIG. 5, where the mobile tube 6 slides on an internal fixed tube 9.

Two arrows, 11 and 12 respectively show the inlet of the principal mixture and the identification mixture.

Extruding the identification mixture after the principal mixture allows a better definition of the design of the identification mixture. The design could not be realised satisfactorily by means of the known-type processes, due to the elasticity of the sacks.

Figure 8:
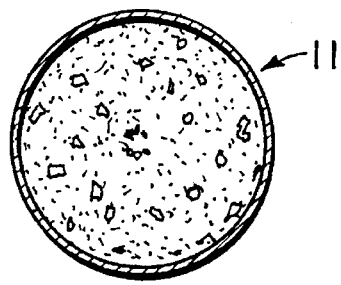
FIG. 8 shows a slice of the product obtained in the case of mortadella production.

The product therefore has an identifying design which could be a letter of the alphabet or a fantasy design serving to identify the origin of any slice of mortadella 11 to the consumer, as FIG. 8 clearly shows.

In particular, the identifying design could be located centrally and might for example be a heart, a rhombus, a flower, a star or a symbol like those on playing cards.

An important and original characteristic of the present process is that the second extrusion i s performed without and relative movement between 10 the identification mixture and the principal mixture, in a direction coinciding with the common axis of both mixtures, considerably enhancing the definition of the identification design.

A relative movement between the two mixtures along the common axis occurs only during the introduction phase of the second extrusion tube into the sack, that is, when the second mixture 6 has not yet been extruded.

The second extruder 6 is equipped with a replaceable shaping head 10.

At the end of the second extrusion the sack is manually or mechanically closed.

The process of the present invention has been described as it appertains to mortadella, but it could be adapted to other foodstuffs which, like mortadella, are packed in elastic sacks.

What is claimed:

1. A process for formation of foodstuffs in sacks, in particular mortadella, comprising: extruding of a principal mixture in a flexible or elastic sack by a first extruder until said sack is full; inserting a second extruder into said sack and then along the entire length thereof; causing said second extruder to inject a second, identifying mixture inside, and preferably centrally of, the principal mixture withdrawing said second extruder from said sack to cause said identifying mixture to extend along said entire length of the sack.

2. A process as in claim 1, wherein the second extrusion is carried out during said withdrawal of the second extruder from the sack without there being any relative movement between the identification mixture and the principal mixture, in a direction coinciding with a common insertion axis of both mixtures, a pumping speed of the second extrusion into said sack being equal to a withdrawal speed of the second extruder from the sack.

3. A process as in claim 1, wherein a relative movement between the two mixtures along said common insertion axis occurs only during an introduction phase of the second extruder into the sack, when the identification mixture has not yet been extruded.

4. A process as in claim 1, wherein the second extrusion, subsequent to the extrusion of the principal mixture, starts from a closed end of the sack which end is opposite to an open end applied to the extruders, with a pumping of the identification mixture occurring at a same time as a withdrawal of the second extruder, which, inserted up to said closed end of the sack up until termination of a filling process of the principal mixture, progressively returns towards the open end of the sack until the sack is freed of the second extruder.

5. A process as in claim 1, wherein the second extrusion following the extrusion of the principal mixture starts from the closed end of the sack and is contemporaneous with a telescopic withdrawal of the second extruder.

6. A process as in claim 1, wherein both extrusions occur with the extrusion tubes being oriented along at least one axis selected from the group consisting of vertical axes or horizontal axes or inclined axes.

7. A process as in claim 1, wherein an insertion of the second extruder occurs in such a way as to produce a second extrusion having a transversal section in a shape of a heart or a flower or a star.

8. A process as in claim 2, wherein a relative movement between the two mixtures along said common insertion axis occurs only during an introduction phase of the second extruder into the sack, when the identification mixture has not yet been extruded.

9. A process as in claim 2, wherein both extrusions occur with the extrusion tubes being oriented along at least one axis selected from the group consisting of vertical axes or horizontal axes or inclined axes.

10. A process as in claim 3, wherein both extrusions occur with the extrusion tubes being oriented along at least one axis selected from the group consisting of vertical axes or horizontal axes or inclined axes.

11. A process as in claim 4, wherein both extrusions occur with the extrusion tubes being oriented along at least one axis selected from the group consisting of vertical axes or horizontal axes or inclined axes.

12. A process as in claim 5, wherein both extrusions occur with the extrusion tubes being oriented along at least one axis selected from the group consisting of vertical axes or horizontal axes or inclined axes.

13. A process as in claim 8, wherein both extrusions occur with the extrusion tubes being oriented along at least one axis selected from the group consisting of vertical axes or horizontal axes or inclined axes.

* * * * *

UNITED STATES PATENT AND TRADEMARK OFFICE
CERTIFICATE OF CORRECTION

PATENT NO. : 5,573,455
DATED : November 12, 1996
INVENTOR(S) : Luigi BARILLI

It is certified that error appears in the above-indentified patent and that said Letters Patent is hereby corrected as shown below:

Title page, [30], Foreign Application Priority Data, change "PR93A0006" to --PR93A000006--.

Signed and Sealed this

Fifteenth Day of April, 1997

Attest:

BRUCE LEHMAN

Attesting Officer          Commissioner of Patents and Trademarks